United States Patent
Kim et al.

(10) Patent No.: US 10,208,710 B2
(45) Date of Patent: Feb. 19, 2019

(54) APPARATUS AND METHOD FOR FILLING LPG VEHICLE WITH LPG

(71) Applicant: Hyundai Motor Company, Seoul (KR)

(72) Inventors: Chang Han Kim, Gwangju (KR); Jae Hwa Park, Suwon-si (KR); Jong Ki Kim, Seongnam-si (KR); Jae Min Lee, Gongju-si (KR); Keun Soo Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 7 days.

(21) Appl. No.: 15/334,558

(22) Filed: Oct. 26, 2016

(65) Prior Publication Data

US 2017/0356389 A1    Dec. 14, 2017

(30) Foreign Application Priority Data

Jun. 9, 2016 (KR) .................. 10-2016-0071499

(51) Int. Cl.
*F02M 21/02* (2006.01)

(52) U.S. Cl.
CPC .... *F02M 21/0212* (2013.01); *F02M 21/0224* (2013.01); *F02M 21/0233* (2013.01); *F02M 21/0281* (2013.01); *Y02T 10/32* (2013.01)

(58) Field of Classification Search
CPC ........... F02M 21/0212; F02M 21/0281; F02M 21/0224; F02M 21/0233
See application file for complete search history.

(56) References Cited

U.S. PATENT DOCUMENTS 3,851,633 A * 12/1974 Shih ................... F02M 1/165
123/179.16
2004/0182452 A1 * 9/2004 Ricco ................. F02M 37/103
137/565.16
2013/0000760 A1 * 1/2013 Crary .................. F01N 3/2066
137/565.17
2014/0084674 A1 * 3/2014 Lee ...................... B60T 8/4068
303/6.01
2014/0109971 A1 * 4/2014 Kim ........................ F16L 53/00
137/1

FOREIGN PATENT DOCUMENTS

| JP | 2010-522309 A | 7/2010 |
| JP | 2011-1900 A | 1/2011 |
| KR | 20-2000-0007742 U | 5/2000 |
| KR | 10-2002-0096073 A | 12/2002 |
| KR | 10-0747240 B1 | 8/2007 |
| KR | 10-0861547 B1 | 10/2008 |
| KR | 10-2013-0065026 A | 6/2013 |
| KR | 10-2013-0066008 A | 6/2013 |

* cited by examiner

*Primary Examiner* — Jacob Amick
*Assistant Examiner* — Charles Brauch
(74) *Attorney, Agent, or Firm* — Morgan, Lewis & Bockius LLP

(57) ABSTRACT

An apparatus for filling a liquefied petroleum gas (LPG) vehicle with LPG may include an auxiliary chamber disposed in an LPG bombe of the LPG vehicle, an auxiliary injection line branched from a fuelling line extending to the LPG bombe from a fuel inlet port for connection to the auxiliary chamber, a solenoid valve mounted in the auxiliary injection line to selectively allow or block a flow of LPG to the auxiliary chamber, a temperature sensor to detect a temperature in the bombe, and a controller to control the solenoid valve to be opened when the temperature detected by the temperature sensor is equal to or higher than a critical temperature.

5 Claims, 5 Drawing Sheets

APPARATUS AND METHOD FOR FILLING LPG VEHICLE WITH LPG

CROSS-REFERENCE TO RELATED APPLICATION

The present application claims priority to Korean Patent Application No. 10-2016-0071499 filed Jun. 9, 2016, the entire contents of which is incorporated herein for all purposes by this reference.

BACKGROUND OF THE INVENTION

Field of the Invention

The present invention relates to an apparatus and method for filling a liquefied petroleum gas (LPG) vehicle with LPG. More particularly, to an apparatus and method for filling an LPG vehicle with LPG, capable of easily filling a bombe with LPG by reducing the temperature and pressure in the bombe using an auxiliary chamber, which may be temporarily filled with cold fuel, when the pressure in the bombe for storing LPG is higher than a filling pressure.

Description of Related Art

As illustrated in FIG. 1, a process of filling an LPG vehicle generally includes a step of operating a filling pump 2 of a gas station, a step of sending LPG to a filling gun 3 from an LPG reservoir 1 of the gas station by the operation of the filling pump 2, and a step of filling an LPG bombe of the vehicle with LPG by the LPG filling pressure of the filling gun 3.

Referring to FIG. 2, an excess flow valve 16, which is connected to a fuel inlet port 14 of the vehicle through a fuelling line 15, is mounted to the inlet of the LPG bombe 10, and a fuel pump module 18 for sending fuel to an engine is disposed inside the bombe 10.

Accordingly, the bombe 10 is filled with LPG through the fuel inlet port 14 and the excess flow valve 16 from the filling gun of the gas station.

However, the filling of LPG may be impossible when the pressure in the LPG bombe of the vehicle is higher than an LPG filling pressure in the hot season during which the outside temperature rapidly rises.

That is, when the pressure in the LPG bombe of the vehicle is higher than the LPG filling pressure, a check valve included in the excess flow valve is not opened. For this reason, it is impossible to fill the LPG bombe with LPG from the filling gun.

For example, as the pressure (e.g. 16.5 bar) in the LPG bombe of the vehicle becomes higher than the LPG filling pressure (16.3 bar=8.3 bar, which is the pressure in the LPG reservoir of the gas station, +8.0 bar, which is an LPG pumping pressure depending on the operation of the filling pump) of the filling gun in the hot season in which the atmospheric temperature is equal to or higher than about 40° C., the check valve included in the excess flow valve is not opened. For this reason, it is impossible to fill the LPG bombe with LPG from the filling gun.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and method for filling an LPG vehicle with LPG, capable of easily filling an LPG bombe of a vehicle with LPG by installing an auxiliary chamber, which may be temporarily filled with cold fuel, in the LPG bombe, and reducing the temperature and pressure in the bombe through heat exchange between the auxiliary chamber and the LPG bombe, when the pressure in the LPG bombe is higher than the LPG filling pressure of a filling gun.

According to various aspects of the present invention, an apparatus for filling a liquefied petroleum gas (LPG) vehicle with LPG may include an auxiliary chamber disposed in an LPG bombe of the LPG vehicle, an auxiliary injection line branched from a fuelling line extending to the LPG bombe from a fuel inlet port for connection to the auxiliary chamber, a solenoid valve mounted in the auxiliary injection line to selectively allow or block a flow of LPG to the auxiliary chamber, a temperature sensor to detect a temperature in the bombe, and a controller to control the solenoid valve to be opened when the temperature detected by the temperature sensor is equal to or higher than a critical temperature.

The auxiliary chamber may include a flange part disposed in a mounting hole formed in the bombe, a heat exchange chamber extending into the bombe from the flange part, and an airtight cover attached to the mounting hole of the bombe in which the flange part is disposed.

A check valve may be mounted to an end of the heat exchange chamber for the LPG to selectively flow into the LPG bombe from the heat exchange chamber.

The auxiliary chamber may be made of an aluminum material having thermal conductivity.

The temperature sensor may be mounted to a fuel pump module disposed in the bombe.

According to various aspects of the present invention, a method for filling an LPG vehicle with LPG may include i) detecting, by a controller, a temperature in an LPG bombe, ii) supplying, by the controller, LPG from a fuelling line to the LPG bombe, when the temperature in the bombe is lower than a critical temperature, iii) supplying, by the controller, the LPG from the fuelling line through an auxiliary injection line to an auxiliary chamber disposed in the LPG bombe, when the temperature in the bombe is equal to or higher than the critical temperature, iv) performing, by the controller, heat exchange between the auxiliary chamber filled with the LPG and an inside of the LPG bombe, and v) supplying, by the controller, the LPG from the fuelling line to the LPG bombe, when the temperature in the LPG bombe is decreased below the critical temperature through the heat exchange.

In the ii) supplying LPG from the fuelling line to the LPG bombe, a solenoid valve mounted to the auxiliary injection line may be controlled to be closed.

In the iii) supplying the LPG from the fuelling line through the auxiliary injection line to the auxiliary chamber, a solenoid valve mounted to the auxiliary injection line may be controlled to be opened.

In the iii) supplying the LPG from the fuelling line through the auxiliary injection line to the auxiliary chamber, the LPG supplied to the auxiliary chamber may be a fuel having a temperature lower than the temperature in the LPG bombe, and is supplied from an underground LPG reservoir of a gas station.

In the v) supplying the LPG from the fuelling line to the LPG bombe, the LPG bombe may be filled with the LPG in the auxiliary chamber.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
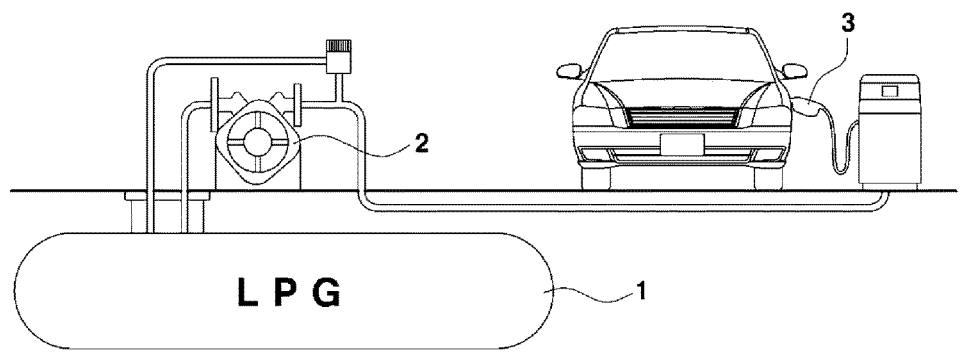
FIG. 1 is a view schematically illustrating a process of filling an liquefied petroleum gas (LPG) vehicle according to the related art.
Figure 2:
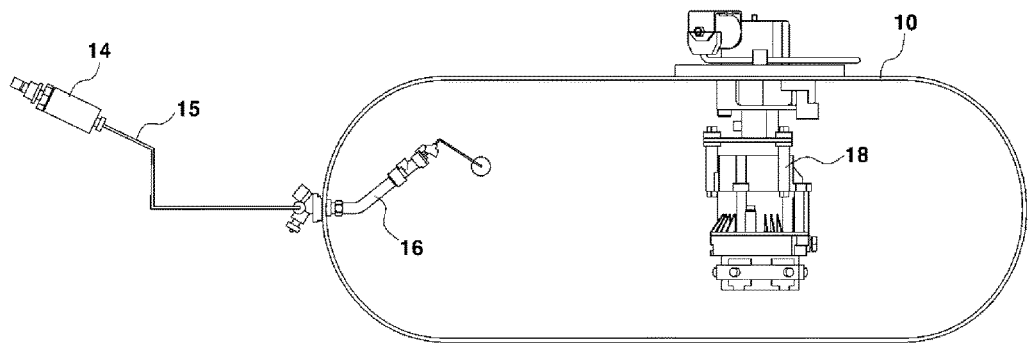
FIG. 2 is a view illustrating a filling apparatus for an LPG vehicle according to the related art.
Figure 3:
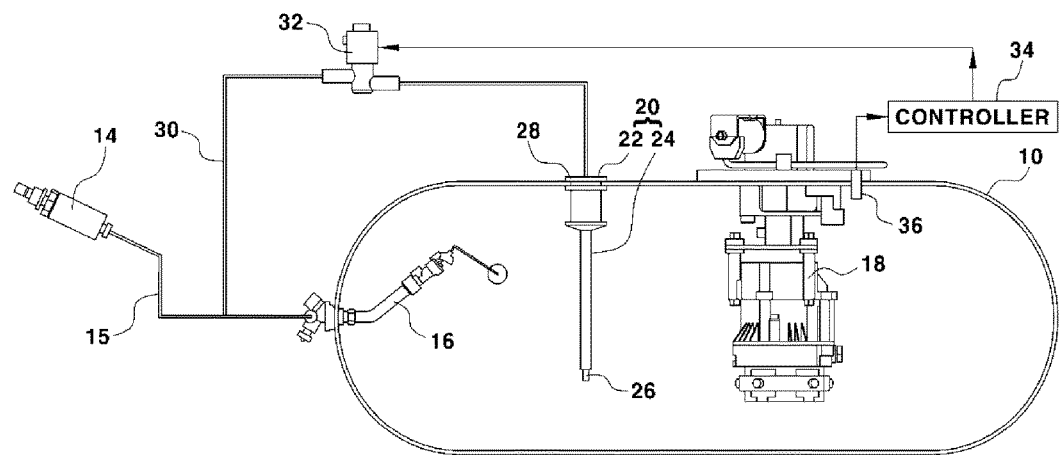
FIG. 3 is a view illustrating a filling apparatus for an LPG vehicle according to various embodiments of the present invention.

FIG. 3 illustrates a filling apparatus for a liquefied petroleum gas (LPG) vehicle according to various embodiments of the present invention.

In FIG. 3, reference numeral 10 refers to an LPG bombe mounted in an LPG vehicle.

An excess flow valve 16, which is connected to a fuel inlet port 14 of the vehicle through a fuelling line 15, is mounted to the inlet of the LPG bombe 10, and a fuel pump module 18 for sending fuel to an engine is installed inside the bombe 10.

Accordingly, the bombe 10 is filled with LPG through the fuel inlet port 14 and the excess flow valve 16 from a filling gun of a gas station.

However, when the temperature and pressure in the LPG bombe of the vehicle are increased in the hot season during which the outside temperature rapidly rises, and the pressure in the bombe is higher than the LPG filling pressure of the filling gun, the filling of LPG may be impossible.

Therefore, various embodiments of the present invention has been made in view of the above problem, and are aimed at facilitating filling of the bombe with LPG by reducing the temperature and pressure in the bombe using an auxiliary chamber, which may be temporarily filled with cold fuel, when the pressure in the bombe for storing LPG is higher than a filling pressure.

The auxiliary chamber 20 is disposed in the LPG bombe 10 mounted in the LPG vehicle.

Figure 4:
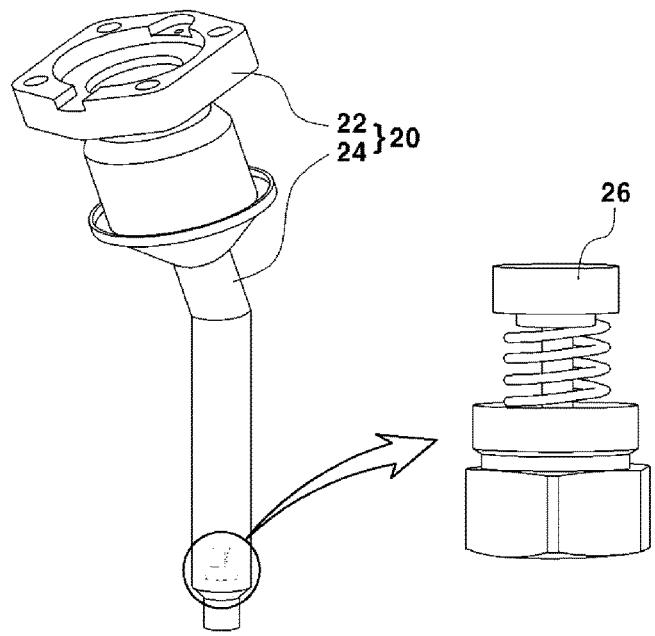
FIG. 4 is a perspective view illustrating an auxiliary chamber of the filling apparatus according to various embodiments of the present invention.
Figure 5:
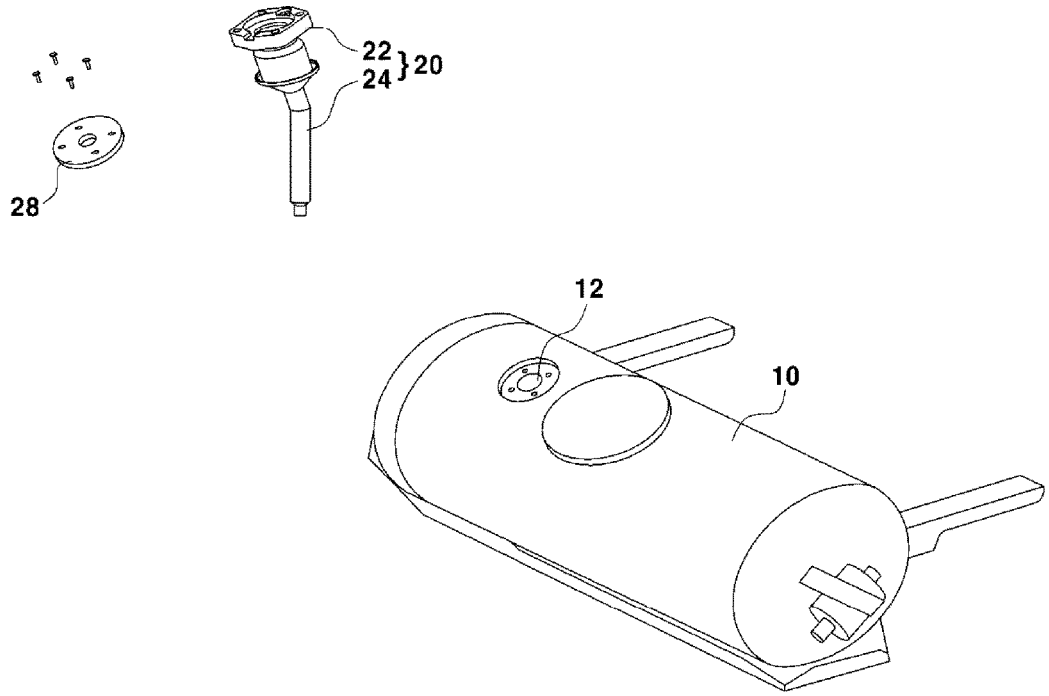
FIG. 5 is a perspective view illustrating a state in which the auxiliary chamber of the filling apparatus according to various embodiments of the present invention is installed in an LPG bombe.

In more detail, the auxiliary chamber 20 includes a flange part 22 placed in a mounting hole 12, which is formed to have a stepped shape in the bombe 10, and a heat exchange chamber 24 which extends to the inside of the bombe 10 from the flange part 22, as illustrated in FIGS. 4 and 5. The auxiliary chamber is preferably made of an aluminum material having high thermal conductivity.

The heat exchange chamber 24 may be preferably formed in various shapes, such as a straight hollow tube or a zigzag tube, in order to secure a heat exchange area suitable for the inner volume of the LPG bombe.

In addition, a check valve 26 is mounted to the end of the heat exchange chamber 24 of the auxiliary chamber 20 in order to allow LPG to flow only into the LPG bombe 10 from the heat exchange chamber 24.

Accordingly, after the heat exchange chamber 24 is inserted into the bombe 10 through the mounting hole 12 of the LPG bombe 10, the flange part 22 is placed on the outer peripheral portion of the mounting hole 12. Subsequently, an airtight cover 28 comes into contact with the flange part 22, and a bolt penetrates the cover 28, the flange part 22, and the bombe 10 so that they are fastened to one another. As a result, the installation of the auxiliary chamber 20 to the bombe 10 is completed.

In this case, an auxiliary injection line 30 branched from the fuelling line 15 penetrates the airtight cover 28, and the end of the penetrated auxiliary injection line 30 is connected to the auxiliary chamber 20 such that the auxiliary injection line 30 communicates with the auxiliary chamber 20.

In more detail, the auxiliary injection line 30 is branched from the fuelling line 15, which is connected between the fuel inlet port 14 and the excess flow valve 16 mounted to the inlet of the LPG bombe 10, and is connected to the auxiliary chamber 20 through the airtight cover 28 so as to communicate with the auxiliary chamber 20.

In addition, a solenoid valve 32, which is opened or closed by the switching control of a controller 34, is mounted to the auxiliary injection line 30.

Accordingly, the solenoid valve 32 serves to allow or block the flow of LPG from the fuelling line 15 via the auxiliary injection line 30 to the auxiliary chamber 20.

Meanwhile, a temperature sensor 36 for detecting the temperature in the bombe 10 is mounted to the fuel pump module 18 installed in the bombe 10, a signal indicative of the temperature in the bombe 10 detected by the temperature sensor 36 is transmitted to the controller 34, and the controller 34 controls the solenoid valve 32 such that the solenoid valve 32 is opened when the temperature detected by the temperature sensor 36 is equal to or higher than a critical temperature.

Hereinafter, the operation of the filling apparatus for an LPG vehicle having the above configuration according to various embodiments of the present invention will be described.

Figure 6:
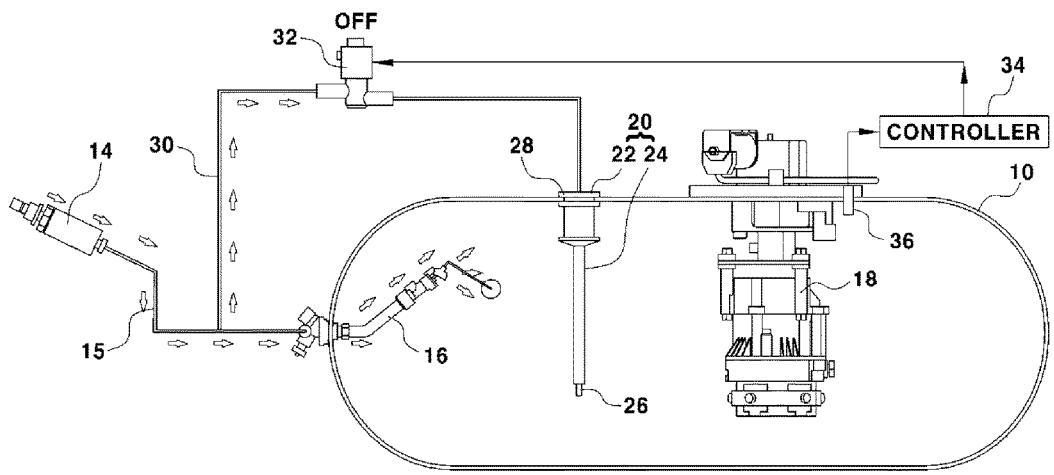
FIG. 6 and FIG. 7 are views illustrating the operation of the filling apparatus for an LPG vehicle according to various embodiments of the present invention.
Figure 7:
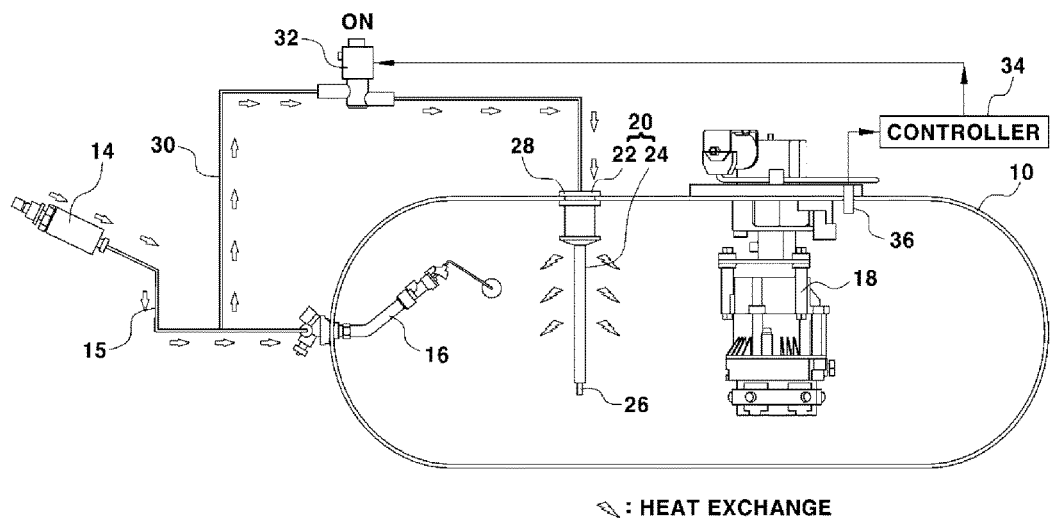
Figure 8:
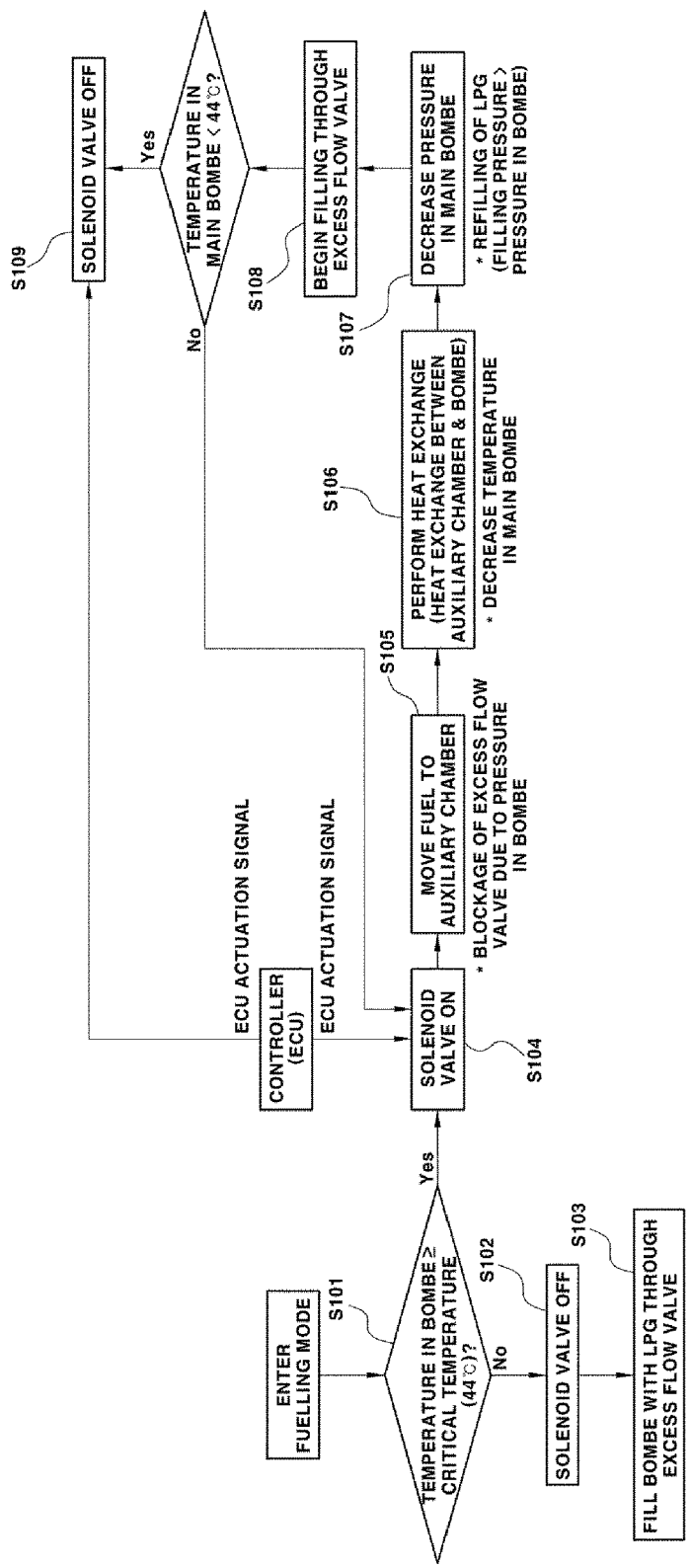
FIG. 8 is a flowchart illustrating a filling method for an LPG vehicle according to various embodiments of the present invention.

FIGS. 6 and 7 are views illustrating the operation of the filling apparatus for an LPG vehicle according to various embodiments of the present invention. FIG. 8 is a flowchart illustrating a filling method for an LPG vehicle according to various embodiments of the present invention.

First, the temperature in the LPG bombe 10 is detected.

The temperature in the bombe 10 is detected by the temperature sensor 36 mounted to the fuel pump module 18 in the bombe 10, and a signal indicative of the detected temperature is transmitted to the controller 34.

Next, the controller 34 compares the current temperature in the bombe 10 with a critical temperature (S101).

When the current temperature in the bombe 10 is lower than the critical temperature (e.g. 44° C.) as a result of the comparison, the controller 34 controls the solenoid valve 32 to be closed (S102).

In other words, when the current temperature in the bombe 10 is lower than the critical temperature, the pressure in the LPG bombe 10 is determined to be lower than the LPG filling pressure of the filling gun. Thus, the controller 34 controls the solenoid valve 32 to be closed.

Accordingly, the bombe 10 is easily filled with LPG through the fuel inlet port 14 and the excess flow valve 16 from the filling gun of the gas station (S103), and at the same time the fuel flowing to the auxiliary injection line 30 from the fuelling line 15 is blocked by the closing of the solenoid valve 32, as illustrated in FIG. 6.

On the other hand, when the current temperature in the bombe 10 is higher than or equal to the critical temperature (e.g. 44° C.), the controller 34 controls the solenoid valve 32 to be opened (S104).

That is, when the current temperature in the bombe 10 is higher than or equal to the critical temperature, the pressure in the LPG bombe 10 is determined to be higher than the LPG filling pressure. Thus, the controller 34 controls the solenoid valve 32 to be opened.

In this case, when the pressure in the LPG bombe is higher than the LPG filling pressure, the check valve included in the excess flow valve is not opened, and it is thus impossible to fill the LPG bombe with LPG.

Thus, the state, in which the bombe 10 is not filled with LPG through the fuel inlet port 14 and the excess flow valve 16 from the filling gun of the gas station, is maintained, and the LPG flows to the auxiliary injection line 30 through the fuelling line 15 from the filling gun while being supplied to the auxiliary chamber 20 through the opened solenoid valve 32 (S105), as illustrated in FIG. 7.

In this case, the LPG supplied to the auxiliary chamber 20 temporarily stays in the heat exchange chamber 24, since the pressure in the LPG bombe 10 is higher than the LPG filling pressure in the heat exchange chamber 24.

Meanwhile, since LPG is supplied to the auxiliary chamber 20 from the underground LPG reservoir of the gas station, the LPG has a temperature lower than the current temperature (e.g. 44° C.) in the LPG bombe, and the LPG stored in the underground LPG reservoir is typically maintained at about 20° C. even in the hot season.

Accordingly, heat exchange is performed between the low-temperature (about 20° C.) LPG, which is supplied to the heat exchange chamber 24 of the auxiliary chamber 20, and the heat present in the interior space of the LPG bombe 10, so that the temperature in the LPG bombe 10 is decreased below a critical temperature after a certain period of time (S106).

As such, when the temperature in the LPG bombe 10 is decreased below the critical temperature, the pressure in the bombe is decreased below the filling pressure of the LPG filling gun (S107).

Thus, when the pressure in the bombe becomes lower than the filling pressure of the LPG filling gun, the bombe 10 is easily filled with LPG through the fuel inlet port 14 and the excess flow valve 16 from the filling gun of the gas station (S108).

In addition, when the temperature in the LPG bombe 10 becomes lower than the critical temperature due to heat exchange through the auxiliary chamber 20, the controller 34 controls the solenoid valve 32 to be closed again (S109).

As described above, when the pressure in the LPG bombe becomes higher than the LPG filling pressure of the filling gun in the hot season (summer time) or the like during which the outside temperature rapidly rises, cold LPG (LPG stored in the underground reservoir of the LPG station), having a temperature lower than the temperature in the LPG bombe is supplied to the auxiliary chamber 20 installed in the LPG bombe 10, so as to reduce the temperature and pressure in the bombe through heat exchange between the auxiliary chamber 20 and the LPG bombe 10. Consequently, it is always possible to smoothly fill the bombe with LPG.

As is apparent from the above description, various embodiments of the present invention have the following effects.

When the pressure in an LPG bombe becomes higher than an LPG filling pressure of a filling gun in the hot season (summer time) or the like during which the outside temperature rapidly rises, cold LPG (LPG stored in the underground reservoir of an LPG station), having a temperature lower than the temperature in the LPG bombe is supplied to an auxiliary chamber installed in the LPG bombe, so as to reduce the temperature and pressure in the bombe through heat exchange between the auxiliary chamber and the LPG bombe. Consequently, it is always possible to smoothly fill the bombe with LPG.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for filling a liquefied petroleum gas (LPG) vehicle with LPG, comprising:
    an auxiliary chamber disposed in an LPG bombe of the LPG vehicle;
    an auxiliary injection line branched from a fuelling line extending to the LPG bombe from a fuel inlet port for fluidic connection of the fueling line to the auxiliary chamber, wherein the LPG is supplied into the LPG bombe through the fuelling line;
    a solenoid valve mounted in the auxiliary injection line to selectively allow or block a flow of LPG from the fueling line to the auxiliary chamber;
    a temperature sensor to detect a temperature in the bombe; and
    a controller to control the solenoid valve to be opened when the temperature detected by the temperature sensor is equal to or higher than a critical temperature, wherein the LPG flows to the auxiliary injection line through the fuelling line from a filling gun while being filled to the auxiliary chamber, when the solenoid valve is opened by the controller.

2. The apparatus of claim 1, wherein the auxiliary chamber comprises:
    a flange part disposed in a mounting hole formed in the bombe;
    a heat exchange chamber extending into the bombe from the flange part; and
    an airtight cover attached to the mounting hole of the bombe in which the flange part is disposed.

3. The apparatus of claim 2, wherein a check valve is mounted to an end of the heat exchange chamber for the LPG to selectively flow into the LPG bombe from the heat exchange chamber.

4. The apparatus of claim 1, wherein the auxiliary chamber comprises an aluminum material having thermal conductivity.

5. The apparatus of claim 1, wherein the temperature sensor is mounted to a fuel pump module disposed in the bombe.

* * * * *